Patented July 28, 1936

2,049,189

UNITED STATES PATENT OFFICE 2,049,189

CARBON COMPOUNDS OF THE ANTHRAQUINONE SERIES

Earl Edson Beard, Arden, Del., assignor to E. I. du Pont de Nemours & Company, Wilmington, Del., a corporation of Delaware No Drawing. Application October 16, 1931, Serial No. 569,267

7 Claims. (Cl. 260—60)

This invention relates to carbon compounds and processes for their production. More particularly it relates to dyes and dye intermediates of the anthraquinone series. It especially contemplates the compounds having the probable formula:

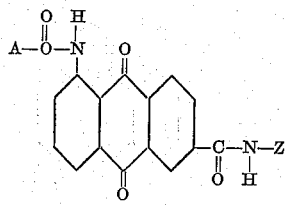

A and Z representing organic radicals or nuclei, and the production of such compounds from 1-nitro-anthraquinone-6-carboxylic acid.

Eckert in 1914 (Monats. fur Chemie 35 289) showed that by nitrating anthraquinone-beta-aldehyde and oxidizing the resultant nitro-anthraquinone-aldehyde that the compound 1-nitro-anthraquinone-6-carboxylic acid is produced.

An object of this invention is the production of new and valuable chemical compounds. Other objects are to produce new dyes, new dye intermediates, new chemical processes and in general to advance the art. Other objects will appear hereinafter.

These objects are accomplished by treating 1-nitro-anthraquinone-6-carboxylic acid in such a way as to produce compounds having the probable formula set out above.

In general, this treatment may be carried out in different ways as follows:

Process I

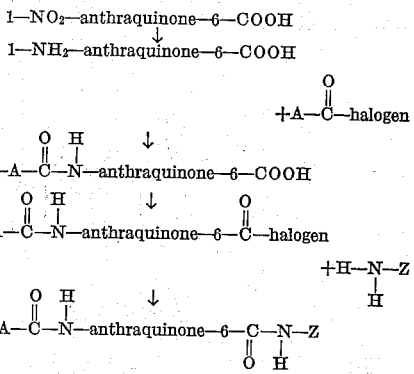

A and Z representing organic nuclei, radicals, residues or groups.

Process II

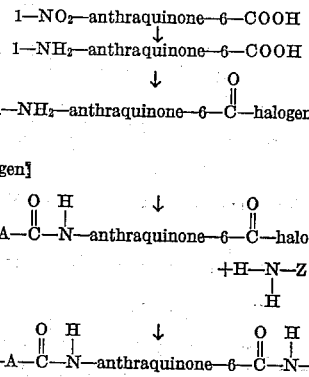

A and Z representing organic nuclei, radicals, residues or groups.

Process III

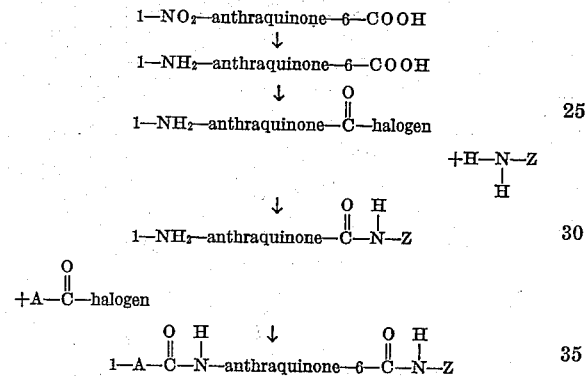

A and Z representing organic nuclei, radicals, residues or groups.

Process IV

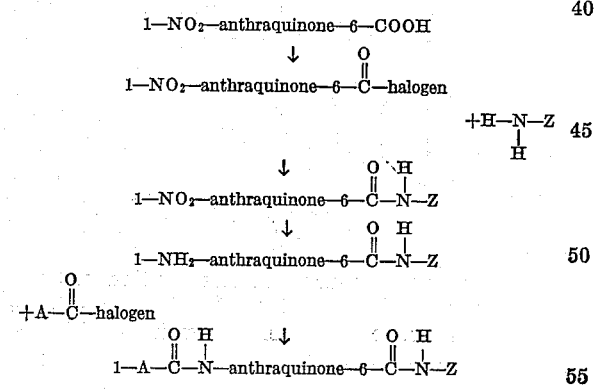

A and Z representing organic nuclei, radicals, residues or groups.

The invention will be further understood from a consideration of the following examples in which the parts are given by weight.

I. Preparation of 1-Amino-Anthraquinone-6-Carboxylic Acid

Example I

Ten (10) parts of 1-nitro-anthraquinone-6-carboxylic acid were dissolved in 200 parts of water containing five (5) parts of soda ash. Eighteen (18) parts of sodium sulfhydrate solution (30% NaSH) were then added and the solution heated at 90° C. for 1–2 hours. Sodium sulphate, 50 parts, was then added to the solution of the sodium salt of 1-amino-anthraquinone-6-carboxylic acid and the whole allowed to cool to 25° C. The product was then filtered and washed with a 20% Na2SO4 solution until the filtrate became clear. The free 1-amino-anthraquinone-6-carboxylic acid was obtained after acidification of the sodium salt. The reactions taking place are illustrated by the following:

$$1\text{—}NO_2\text{—anthraquinone—}6\text{—}COOH$$
$$\downarrow \quad Na_2CO_3$$
$$1\text{—}NO_2\text{—anthraquinone—}6\text{—}\overset{O}{\overset{\|}{C}}\text{—}ONa$$
$$\downarrow \quad NaSH$$
$$1\text{—}NH_2\text{—anthraquinone—}6\text{—}\overset{O}{\overset{\|}{C}}\text{—}ONa$$
$$\downarrow$$
$$1\text{—}NH_2\text{—anthraquinone—}6\text{—}COOH$$

II. Condensation of 1-Amino-Anthraquinone-6-Carboxylic Acid with Acid Halides

Example II

Ten (10) parts of 1-amino-anthraquinone-6-carboxylic acid and 5 parts of acetyl chloride were condensed in 100–150 parts of xylene at 130–140° C. The product of the reaction is believed to have the following structural formula:

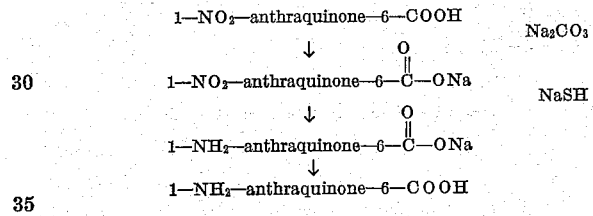

Example III

Ten (10) parts of 1-amino-anthraquinone-6-carboxylic acid and 7 parts of benzoyl chloride were heated together in 50 parts of nitrobenzene at 140–150° C. for 1–2 hours. The reaction mass was thereafter cooled and filtered. The final product has the following formula:

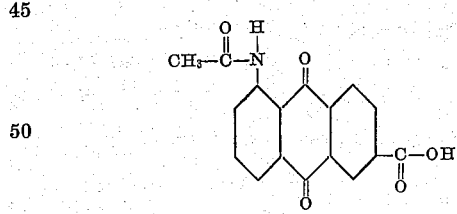

The resultant product produces a yellow color in sulphuric acid and a wine colored hydrosulphite vat. The reduced product on oxidation changes color from red to brown.

Example IV

Ten (10) parts of 1-amino-anthraquinone-6-carboxylic acid were reacted with 8 parts of meta-methoxy-benzoyl-chloride in 100 parts of xylene while heating at 130–150° C. for 1–2 hours. The formula of the final product is as follows:

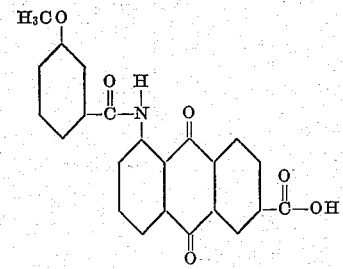

Example V

Twenty-six and four-tenths (26.4) parts of 1-amino-anthraquinone-6-carboxylic acid and ten (10) parts of terephthaloyl chloride were condensed in 100 parts of nitrobenzene at 135–145° C. The final product is thought to have the following structural formula:

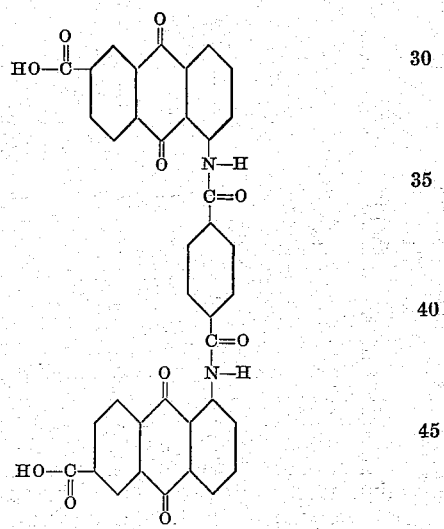

Example VI

Ten (10) parts of 1-amino-anthraquinone-6-carboxylic acid were reacted with 7.5 parts of beta-naphthoyl-chloride in 70 parts of ortho-dichloro-benzene by heating at 125–145° C. for 1–2 hours. The resultant compound was isolated, washed and dried. The formula of the final product follows:

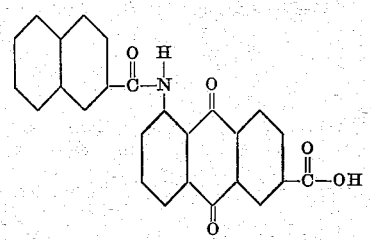

Example VII

Ten (10) parts of 1-amino-anthraquinone-6-carboxylic acid and 10.2 parts of anthraquinone-2-carbonyl-chloride were condensed in 100 parts of nitrobenzene at 150° C. The final product is believed to have the following structural formula:

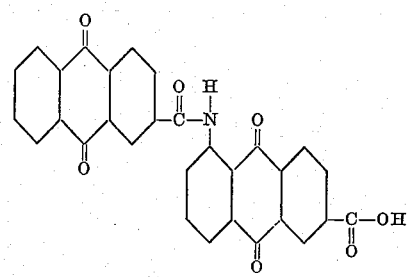

This product produces a yellow sulphuric acid solution and vats to a wine colored alkaline hydrosulphite solution. On the fiber the product oxidizes through green to brown.

*Example VIII*

Ten (10) parts of 1-nitro-anthraquinone-6-carbonyl-chloride and 8.5 parts of 1-amino-anthraquinone-6-carboxylic acid were heated together in 100 parts of nitrobenzene at 150° C. for 1–2 hours. The reaction mass was cooled, diluted with alcohol and filtered. The final product is believed to have the following structural formula:

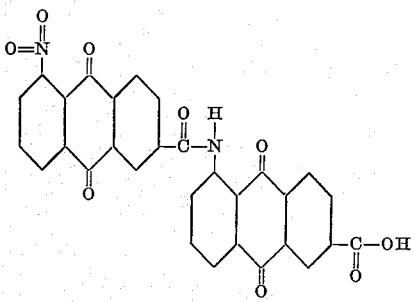

The resultant product produces a greenish-yellow sulphuric acid solution and is reduced in an alkaline hydrosulphite vat to the corresponding amino body. The vat is red in color and dyes cotton fiber red.

*Example IX*

Ten (10) parts of 2-anthraquinoyl-amino-1'-anthraquinone-6'-carbonyl chloride (Example VII) and 5.1 parts of 1-amino-anthraquinone-6-carboxylic acid were condensed in 125 parts of nitrobenzene at 150° C. The final product is believed to have the following structural formula:

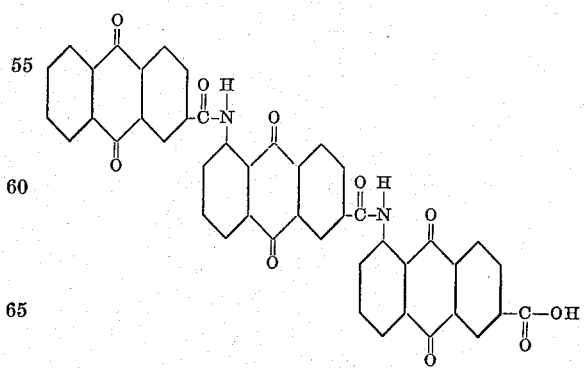

*Example X*

Ten (10) parts of 1-amino-anthraquinone-6-carboxylic acid were heated and stirred with 11.8 parts of 1:9-anthraiso-thiazole-2-carbonyl chloride in 300 parts nitrobenzene to 150° C. for one hour. The new condensation product separates out in yellow needles and may be filtered off after cooling the charge. The final product is believed to have the following structural formula:

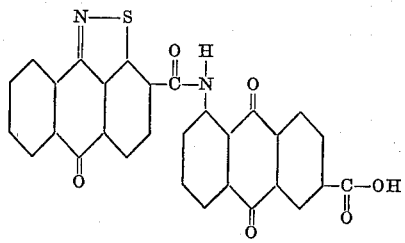

This product produces an orange to yellow color in sulphuric acid and a blue colored alkaline hydrosulphite vat. The reduced product on oxidation changes color on the fiber from blue to green to brown to yellow.

*Example XI*

Ten (10) parts of 1-amino-anthraquinone-6-carboxylic acid were heated and stirred with 13 parts of 1:9-anthraiso-selenazole-2-carbonyl chloride in 300 parts nitrobenzene to 150° C. for one hour. The new condensation product separated out in yellow needles and was filtered off after cooling the charge. The final product is believed to have the following structural formula:

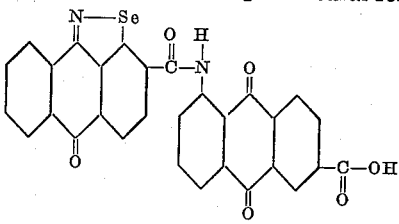

*Example XII*

Six and eight-tenths (6.8) parts of 1-amino-anthra-quinone-6-carboxylic acid and 10 parts of anthraquinone 2:1-phenyl acridone-4'-carbonyl chloride were heated together in 200 parts of nitrobenzene at 140–150° C. for 2–3 hours. The reaction mass was filtered, washed with alcohol and dried. The final product is believed to have the following structural formula:

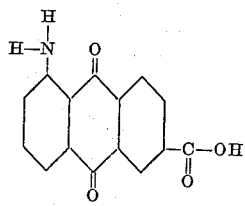

III. PREPARATION OF 1-ACYL-AMINO-ANTHRAQUINONE-6-CARBONYL-HALIDES

*Example XIII*

The product of Example III was heated with 8 parts of phosphorus pentachloride in 40 parts of toluene at 85–95° C. for one-half to one hour. The resultant product has the following probable formula:

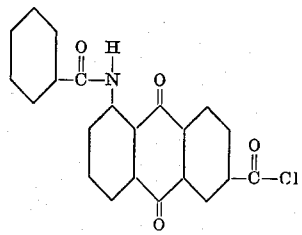

*Example XIV*

The product produced in Example VII was heated with 17 parts of phosphorus pentachloride in 200 parts of nitrobenzene at 110° C. for one to one and one-half hours. The reaction mass was cooled, diluted with benzene and filtered. The reaction product has the following probable formula:

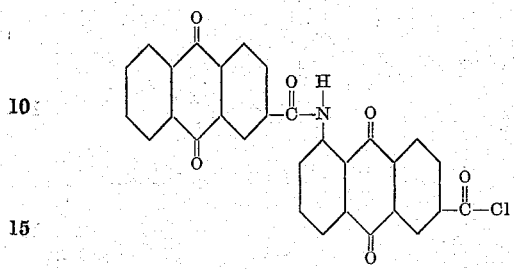

Example XV

The wet cake resulting from the process of Example X was suspended in 100 parts of nitrobenzene and 16 parts of phosphorus pentachloride added and the resultant mass heated to 100° C. and held for one hour. After cooling the product was filtered, washed with nitrobenzene and benzene and dried. The compound produced has the following probable formula:

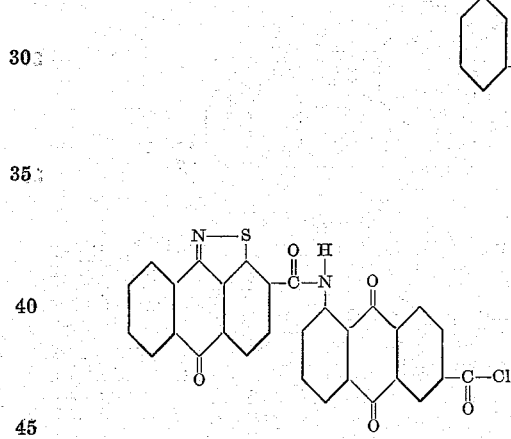

and is an orange to yellow crystalline powder soluble in pyridine with a yellow color. It dissolves in sulphuric acid with the evolution of hydrochloric acid and the production of an orange to yellow colored solution.

Example XVI

The wet cake resulting from the process of Example XI was suspended in 100 parts of nitrobenzene, 16 parts of phosphorus pentachloride added and the mass heated to 100° C. where it was held for one hour. After cooling the reaction mass was filtered, and the solid acid chloride washed with nitrobenzene and petroleum ether and dried. The compound produced has the following probable formula:

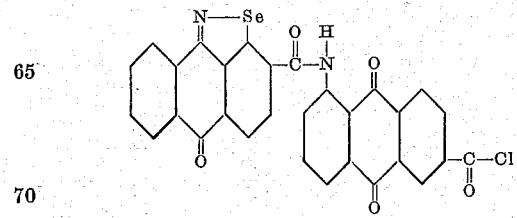

and is a dark yellow crystalline powder soluble in concentrated sulphuric acid and pyridine with a yellow color. Hydrochloric acid is evolved from the sulphuric acid solution.

Example XVII

The product produced by the process of Example XII was heated with 15 parts of phosphorus pentachloride in 100 parts of nitrobenzene at 90–100° C. for one hour. The resultant product has the following probable formula:

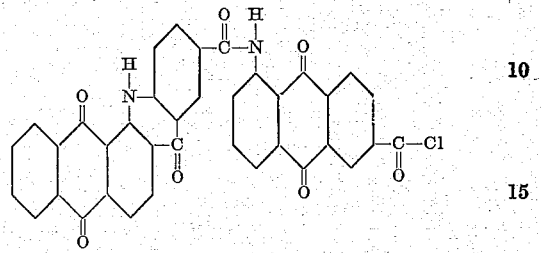

IV. CONDENSATION OF 1-ACYL-AMINO-ANTHRAQUINONE-6-CARBONYL HALIDES WITH AMINES

Example XVIII

Ten (10) parts of benzoyl-amino-1-anthraquinone-6-carbonyl chloride (Examples III and XIII) were reacted with 1.4 parts of para-phenylene-diamine in 100 parts of nitrobenzene at 150° C. The final product is believed to have the following structural formula:

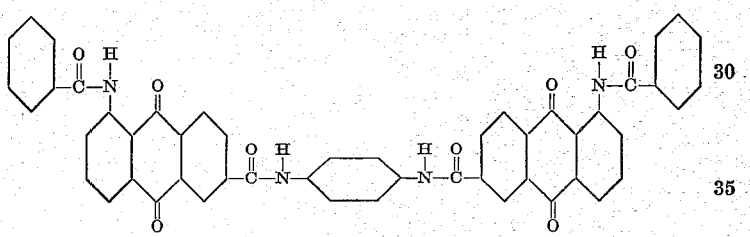

Example XIX

Ten (10) parts of benzoyl-amino-anthraquinone-6-carbonyl-chloride (Examples III and XIII) and 2.36 parts of benzidine were caused to react by heating together in 150–200 parts of nitrobenzene at 140–150° C. for 2 hours. The final product is believed to have the following structural formula:

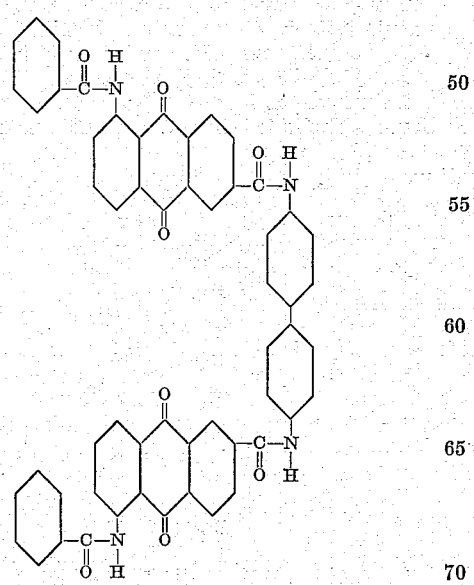

Example XX

Ten (10) parts of benzoyl-amino-1-anthraquinone-6-carbonyl-chloride (Examples III and XIII) and 3.0 parts of 1:5-di-amino-anthraquinone were placed in 100 parts of nitrobenzene and reacted at 150° C. The final product is believed to have the following structural formula:

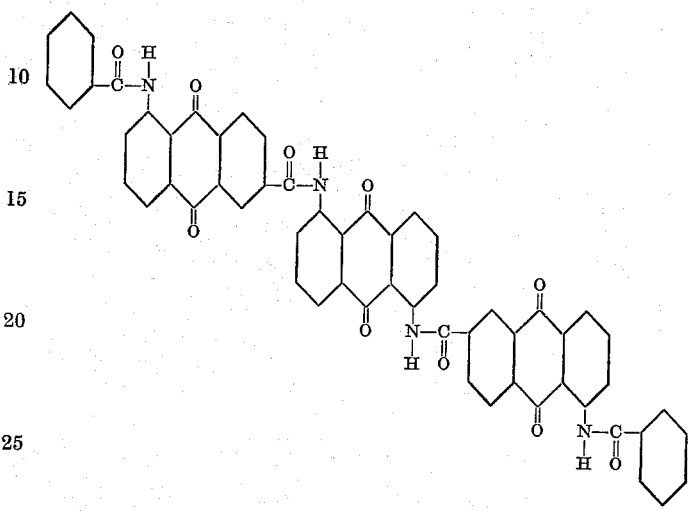

The resultant product produces a yellow color in sulphuric acid and dyes cotton in yellowish shades from a Bordeaux to brown colored hydrosulphite vat.

Example XXI

Ten (10) parts of 1-benzol-amino-anthraquinone-6-carbonyl chloride (Examples III and XIII) were heated with 5.7 parts of alpha-aminoanthraquinone in 150 parts of nitrobenzene to 130–140° C. and this temperature maintained for about one hour. The mass was then cooled to 60–70° C. and filtered, washed and dried. It is a yellowish powder, soluble in sulphuric acid with a yellow color and dyes cotton in yellowish shades. The final product is believed to have the following structural formula:

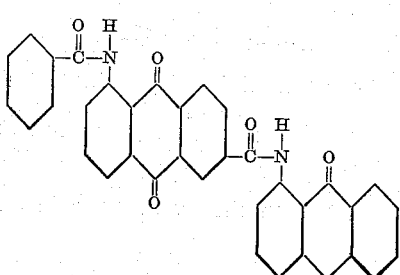

Example XXII

Ten (10) parts of 1-benzoyl-amino-anthraquinone-6-carbonyl chloride (Examples III and XIII) were suspended in 150 parts of nitrobenzene and 8.8 parts of mono-benzoyl-1:5-di-amino-anthraquinone added at room temperatures. The mass was heated to 140–150° C. and this temperature maintained for two hours. The resultant dyestuff was filtered at 80° C., washed and dried. It is a yellow product and is soluble in sulphuric acid with a yellow color. It dyes cotton in extremely fast yellow shades from a Bordeaux vat. The final product is believed to have the following structural formula:

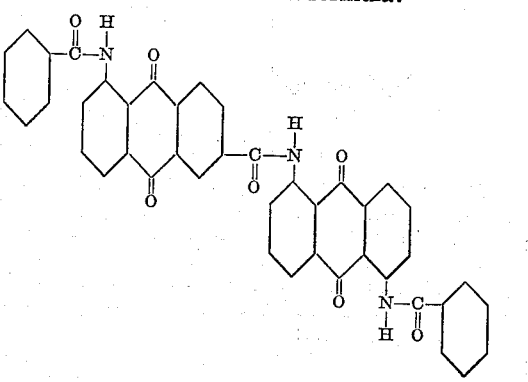

Example XXIII

Ten (10) parts of benzoyl-amino-anthraquinone-6-carbonyl chloride (Examples III and XIII) and 6.5 parts of 1:9-anthraisothiazole-2-amine were caused to react by heating together in 250 parts of nitrobenzene at 150° C., for 2–3 hours. The final product is believed to have the following structural formula:

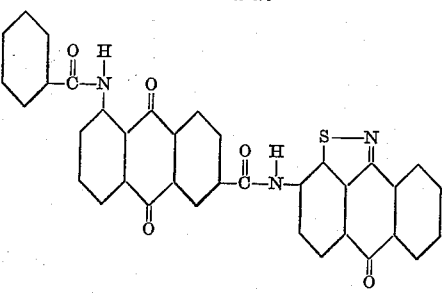

The resultant product was isolated and dried. It gives a yellow to orange color in sulphuric acid and a red colored alkaline hydrosulphite vat. The leuco compound oxidizes on cotton through orange to yellow-brown to yellow shades.

Example XXIV

Ten (10) parts of the acid chloride of the compound produced according to Example V were condensed with 6.4 parts of alpha-amino-anthraquinone by heating in 200-300 parts of nitrobenzene at 140-150° C. for 2 hours. The final product is believed to have the following structural formula:

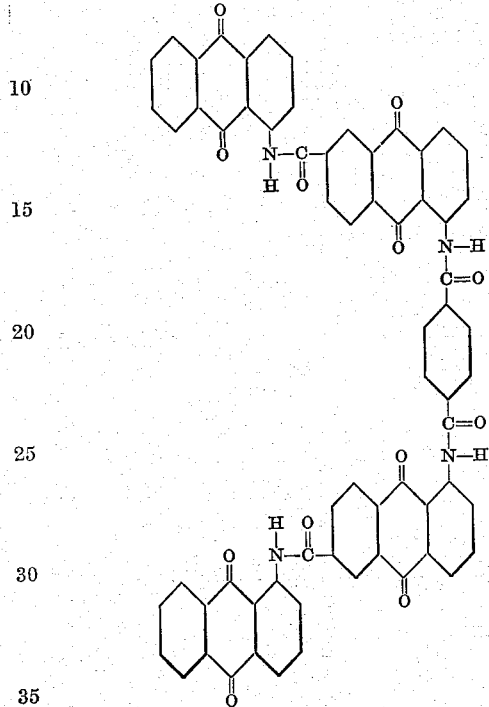

*Example XXV*

Ten (10) parts of 1-meta-methoxy-benzoyl-amino-anthraquinone-6-carbonyl chloride (Example IV) were condensed with 5.3 parts of alpha-amino-anthraquinone by heating in 125 parts of nitrobenzene at 140° C. for 2 hours. The final product is believed to have the following structural formula:

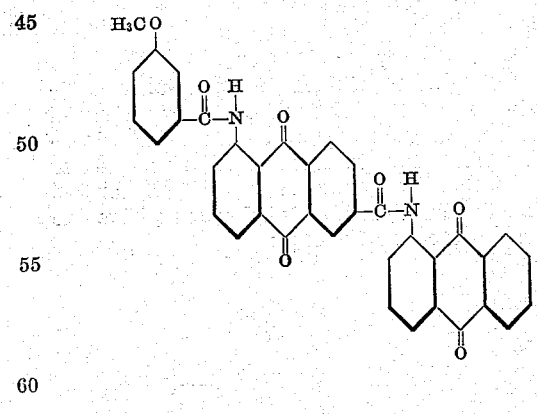

*Example XXVI*

Ten (10) parts of 1-beta-naphthoyl-amino-anthraquinone-6-carbonyl chloride (Example VI) and 5.1 parts of alpha-amino-anthraquinone were caused to react by heating together in 120 parts of nitrobenzene at 140° C. for 1-2 hours. The final product is believed to have the following structural formula:

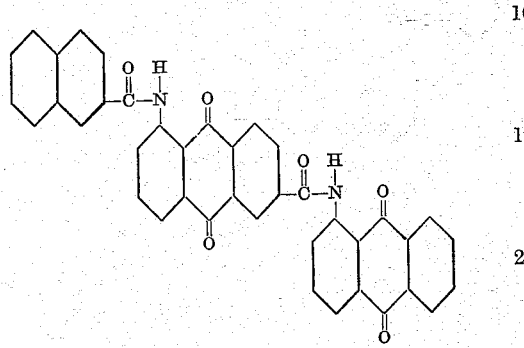

*Example XXVII*

Ten (10) parts of 1-beta-anthraquinoyl-amino-anthraquinone-6-carbonyl chloride (Example VII) and 4.3 parts of alpha-amino-anthraquinone were caused to condense by heating together in 150 parts of nitrobenzene at 150° C. for 2 hours. The final product is believed to have the following structural formula:

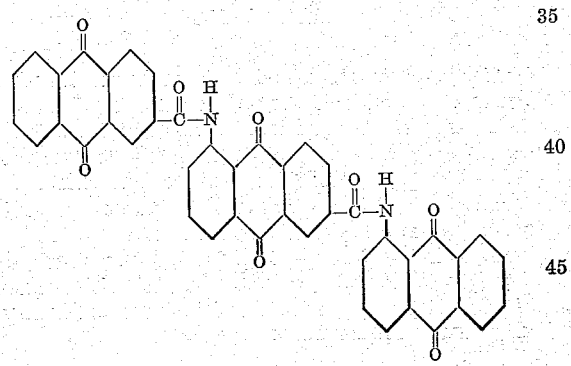

*Example XXVIII*

Ten (10) parts of 2-anthraquinoyl-amino-1'-anthraquinone-6'-carbonyl chloride (Example VII) was condensed with 6.6 parts of mono-benzoyl-1:5-diamino-anthraquinone in 150 parts of nitrobenzene at 150-160° C. The final product is believed to have the following structural formula:

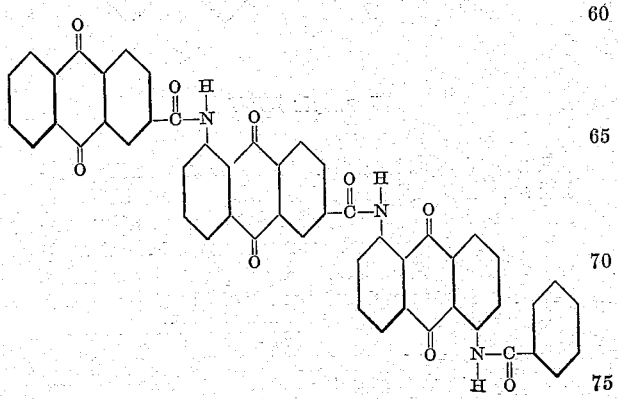

The resultant product produces a yellow color in sulphuric acid and dyes cotton in a greenish yellow shade from a red-brown colored alkaline hydrosulphite vat.

Example XXIX

Ten (10) parts of 2-anthraquinoyl-amino-1'-anthraquinone-6'-carbonyl chloride (Example VII) and 6.6 parts of 1-amino-anthraquinone-6-carboxylic-acid-anilide were placed in 125 parts of nitrobenzene and condensed at 150° C. The final product is believed to have the following structural formula:

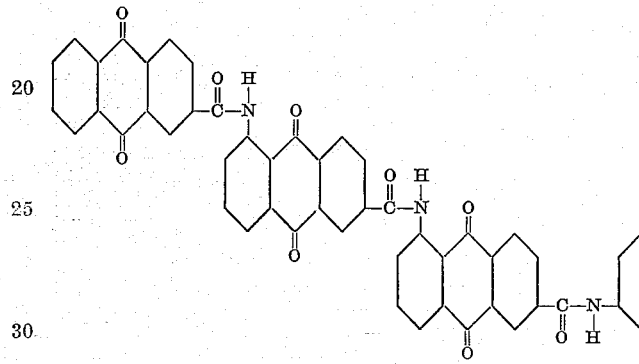

This product gives a yellow sulphuric acid solution and a red alkaline hydrosulphite vat. It dyes cotton in greenish yellow shades.

Example XXX

Ten (10) parts of 2-anthraquinoyl-amino-1'-anthraquinone-6'-carbonyl chloride (Example VII) and 2.25 parts of 1:5-di-amino-anthraquinone were caused to react in 150 parts of nitrobenzene at 150–160° C. The final product is believed to have the following structural formula:

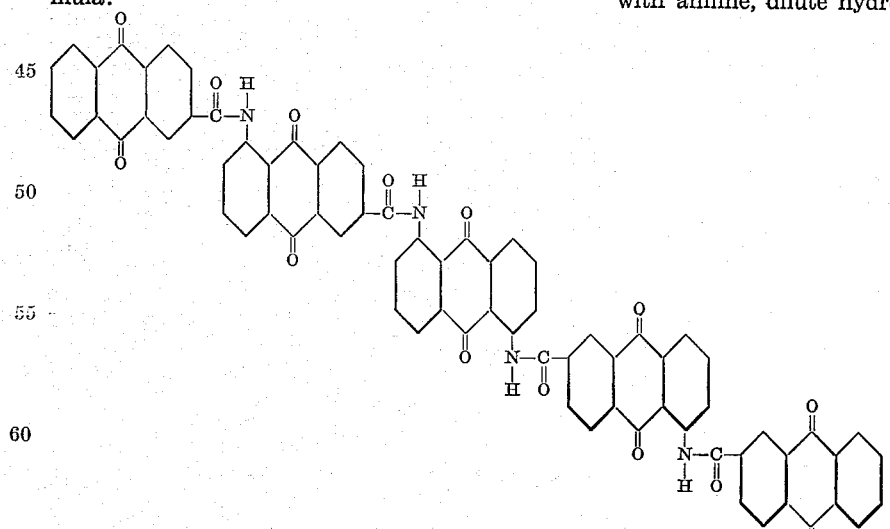

The resultant product produces a yellow color in sulphuric acid and dyes cotton in a greenish yellow shade from a red-brown colored alkaline hydrosulphite vat.

Example XXXI

Ten (10) parts of 2-anthraquinoyl-amino-1'-anthraquinone-6'-carbonyl chloride (Example VII) and 2.25 parts of 1:4-diamino-anthraquinone were reacted in 150 parts of nitrobenzene at 150–160° C. The final product is believed to have the following structural formula:

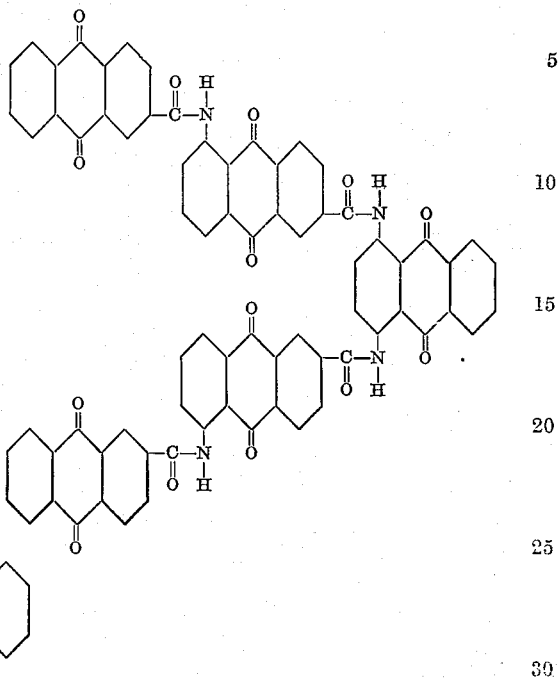

This product produces an orange colored sulphuric acid solution and a Bordeaux to violet colored alkaline hydrosulphite vat. It dyes cotton in an orange shade.

Example XXXII

Ten (10) parts of 1:9-anthraisothiazoyl-amino-1'-anthraquinone-6'-carbonyl-chloride (Examples X and XV) were suspended in 200 parts of aniline and heated at 135–150° C. for one hour. The reaction mixture was cooled, filtered and washed with aniline, dilute hydrochloric acid and water in the order named. The final product is believed to have the following structural formula:

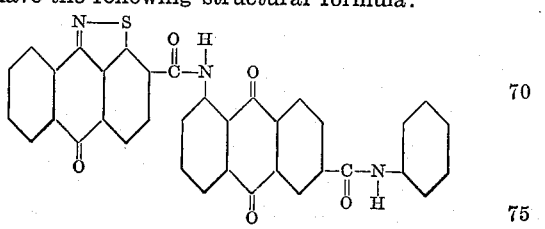

The dyestuff produced gives a yellow to orange color when dissolved in sulphuric acid and dyes cotton in greenish-yellow shades from a blue alkaline hydrosulphite vat.

Example XXXIII

Ten (10) parts of 1:9-anthraisothiazoyl-amino-1'-anthraquinone-6'-carbonyl-chloride (Examples X and XV) and 3.5 parts of para-bromaniline were heated together in 150 parts of nitrobenzene at 140–150° C. for 1–2 hours. The reaction mass was cooled and filtered. The final product is believed to have the following structural formula:

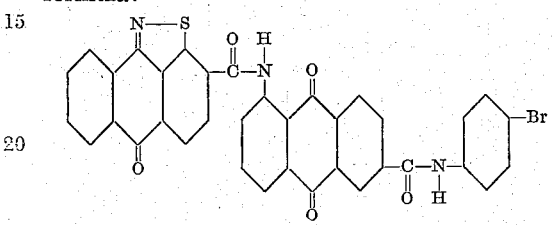

the resultant product gives a yellow sulphuric acid solution and dyes cotton in greenish-yellow shades from a blue hydro-sulphite vat.

Example XXXIV

Ten (10) parts of 1:9-anthraisothiazoyl-amino-1'-anthraquinone-6'-carbonyl-chloride (Examples X and XV) and 3 parts of para-anisidine were heated together in 150 parts of nitrobenzene at 140–150° C. for 1–2 hours. The reaction mass was cooled and filtered. The final product is believed to have the following structural formula:

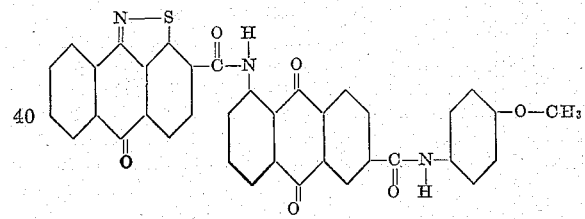

the resultant product gives a yellow sulphuric acid solution and dyes cotton in greenish-yellow shades from a blue hydro-sulphite vat.

Example XXXV

Ten (10) parts of 1:9-anthraisothiazoyl-amino-1'-anthraquinone-6'-carbonyl-chloride (Examples X and XV) and 4 parts of 2:5-di-chloraniline were heated together in 150 parts of nitrobenzene at 140–150° C. for 1–2 hours. The reaction mass was cooled and filtered. The final product is believed to have the following structural formula:

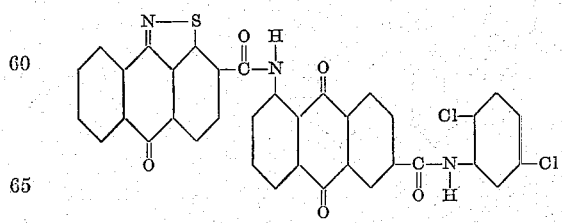

the resultant product gives a yellow sulphuric acid solution and dyes cotton in greenish-yellow shades from a blue hydro-sulphite vat.

Example XXXVI

Ten (10) parts of 1:9-anthraisothiazoyl-amino-1'-anthraquinone-6'-carbonyl chloride (Examples X and XV) and 3.2 parts of di-phenyl amine were heated together in 150 parts of nitrobenzene at 140–150° C. for 1–2 hours. The reaction mass was cooled and filtered. The final product is believed to have the following structural formula:

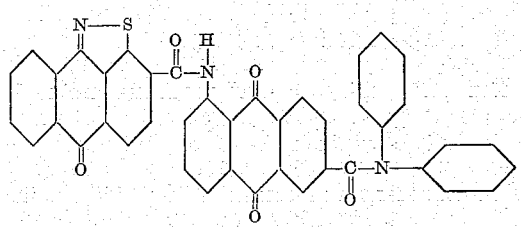

The resultant product gives a yellow sulphuric acid solution and dyes cotton in greenish-yellow shades from a blue hydro-sulphite vat.

Example XXXVII

Ten (10) parts of 1:9-anthraisothiazoyl-amino-1'-anthraquinone-6'carbonyl chloride (Examples X and XV) and 2.6 parts of alpha-naphthylamine were heated together in 150 parts of nitrobenzene at 140–150° C. for 1–2 hours. The reaction mass was cooled and filtered. The final product is believed to have the following structural formula:

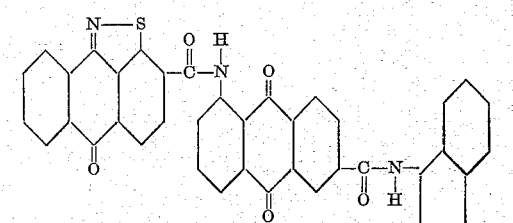

The resultant product gives a yellow sulphuric acid solution and dyes cotton in greenish-yellow shades from a blue hydro-sulphite vat.

Example XXXVIII

In 250 parts of nitrobenzene there was suspended 10 parts of 1':9'-anthraisothiazoyl-1-aminoanthraquinone-6-carbonyl chloride (Examples X and XV) and 6.2 parts of monobenzoyl-1:5-diamino-anthraquinone and the resultant suspension heated at 150° C. for a period of one and one-half hours. The product which consisted of yellow needles separated out and was filtered at 80–90° C., washed with nitrobenzene and alcohol, and dried. It dissolves in concentrated sulphuric acid with yellow to orange color and dyes cotton from a blue vat in fast yellow shades. The final product is believed to have the following structural formula:

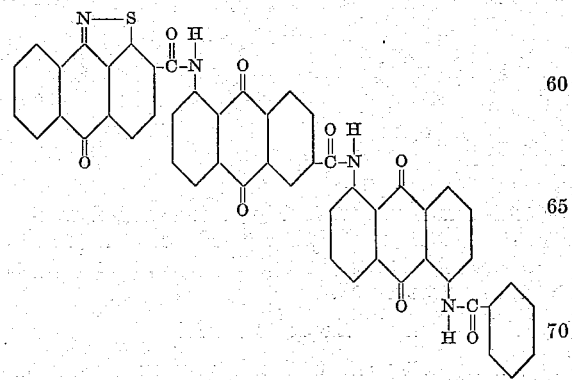

Example XXXIX

Ten (10) parts of 1:9-anthraisothiazoyl-amino-1'-anthraquinone-6'-carbonyl chloride (Examples X and XV) and 4 parts of beta-amino-phenazine were heated together in 150 parts of nitrobenzene at 140-150° C. for 1-2 hours. The reaction mass was cooled and filtered. The final product is believed to have the following structural formula:

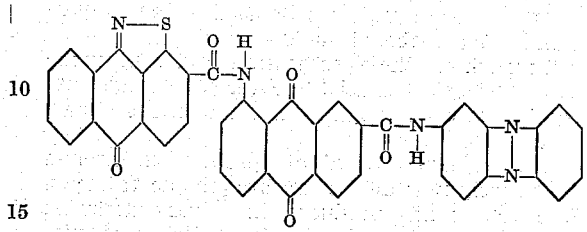

The resultant product gives a yellow sulphuric acid solution and dyes cotton in greenish-yellow shades from a blue hydro-sulphite vat.

*Example XL*

Ten (10) parts of 1:9-anthraisothiazoyl-amino-1'-anthraquinone-6'-carbonyl chloride (Examples X and XV) and 4.6 parts of 1:9-anthraisothiazole-5-amine were caused to react in 300 parts of nitrobenzene at 150-160° C. The final product is believed to have the following structural formula:

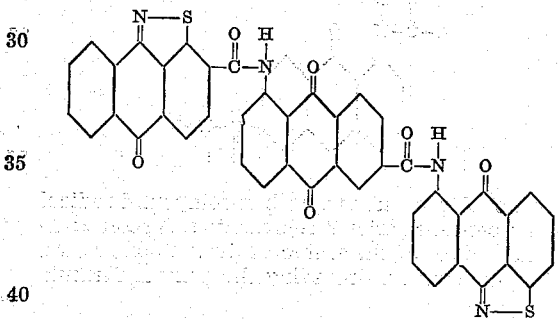

The resultant product gives a yellow sulphuric acid solution and dyes cotton in greenish-yellow shades from a blue hydrosulphite vat.

*Example XLI*

Ten (10) parts of anthraquinone-2:1-phenyl-acridone-4'-carbonyl-amino-1''-anthraquinone-6''-carbonyl chloride (Examples XII and XVII) were suspended in 200 parts of aniline and heated at 135-150° C. for one hour. The reaction mass was cooled, filtered and washed respectively with aniline, dilute hydrochloric acid and water. The final product is believed to have the following structural formula:

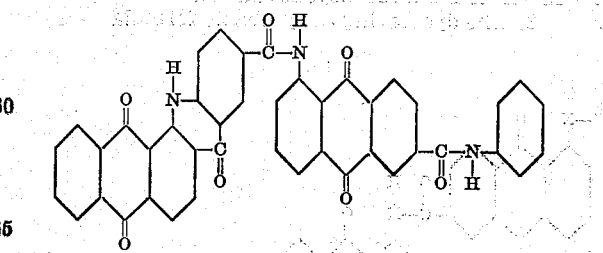

The dyestuff produced yields yellow to orange colored sulphuric acid solutions and dyes cotton in orange shades from red-violet alkaline hydrosulphite vats.

It is to be understood that the invention is not limited to the preparation of the particular compounds set out in the above examples. In the general formula, A and Z may represent any organic radical or residue. For the condensation with the amino group of the 1-amino-anthraquinone-6-carboxylic acid there may be used acyclic carbonyl halides, carbocyclic carbonyl halides and heterocyclic carbonyl halides. Particularly desirable results are obtained with such compounds as acetyl-chloride, acetyl-bromide, chlor-acetyl-chloride, propionyl-chloride, succinyl-chloride, oxalyl-chloride, Benzoyl chloride
Benzoyl bromide
anisyl chlorides

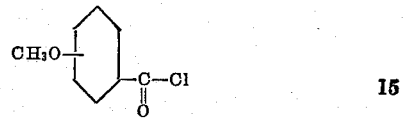

nitro-benzoyl chlorides

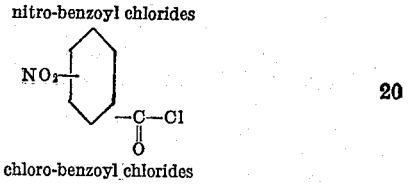

chloro-benzoyl chlorides

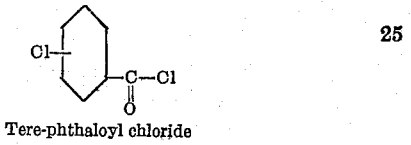

Tere-phthaloyl chloride
Iso-phtahahlic acid chloride
Alpha-naphthoyl chloride
Beta-naphthoyl chloride
Beta-anthraquinone-carbonyl chloride
Beta-anthraquinone-carbonyl bromide
1-amino-anthraquinone-2-carbonyl chloride
1-amino-anthraquinone-6-carbonyl chloride
1-chloro-anthraquinone-2-carbonyl chloride
1-chloro-anthraquinone-6-carbonyl chloride
1, 9-anthraisothiazole-2-carbonyl chloride
1, 9-anthraisothiazole-4-carbonyl chloride
1, 9-anthraisothiazole-5-carbonyl chloride
1, 9-anthraisoselenazole-2-carbonyl chloride
1, 9-anthraisothiophene-2-carbonyl chloride
Anthraquinone-2:1-phenyl-acridone-4'-carbonyl chloride
1, 9-anthraisothiazoyl-amine (2)-1'-anthraquinone-6'-carbonyl chloride
1, 9-anthraisoselenazole-amino-(2)-1'-anthraquinone-6-carbonyl chloride
Anthraquinone-2, 1-phenyl-acridone-4'-carbonyl-amino-1''-anthraquinone-6''-carbonyl chloride For the condensation with the acid chloride group of the 1-amino-anthraquinone-6-carbonyl halide, especially desirable results are produced with such acyclic, carbocyclic and heterocyclic amines as, amino-acetic acid, methyl-amine, ethyl-amine, n-amyl-amine, n-hexyl-amine, ethylene-diamine, tri-methylene-diamine, Aniline
Di-phenyl-amine
Para-brom-aniline
Para-anisidine
2, 5-di-chlor-aniline
Para-nitraniline
Para-phenylene-diamine
amino-benzoic acids

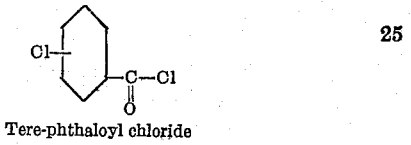

Alpha-naphthylamine
Beta-naphthylamine
Benzidine
Beta-amino-anthraquinone
Alpha-amino-anthraquinone
1, 5-diamino-anthraquinone
1, 4-diamino-anthraquinone
1-amino-4-methoxy-anthraquinone
1-amino-5-benzoyl-amino-anthraquinone 1-amino-2-chloro-anthraquinone
1-amino-4-chloro-anthraquinone
1-amino-5-chloro-anthraquinone
1-amino-6-chloro-anthraquinone
1,5-diamino-4,8-dichloro-anthraquinone
1-amino-anthraquinone-6-carboxylic acid
1-amino-anthraquinone-7-carboxylic acid
1,5-diamino-4-hydroxy-anthraquinone
1,5-diamino-4,8-di-hydroxy-anthraquinone
1,5-diamino-4,8-di-methoxy-anthraquinone
Bz-1-amino-benzanthrone
Bz-1-amino-2-methyl-benzanthrone
1,9-anthraisothiazole-2-amine
1,9-anthraisothiazole-4-amine
1,9-anthraisothiazole-5-amine
1,9-anthraisoselenazole-2-amine
1,9-anthraisoselenazole-4-amine
1,9-anthraisoselenazole-5-amine
Beta-amino-phenazine
Piperidine
Pyridine Dyestuffs having the specific formula:

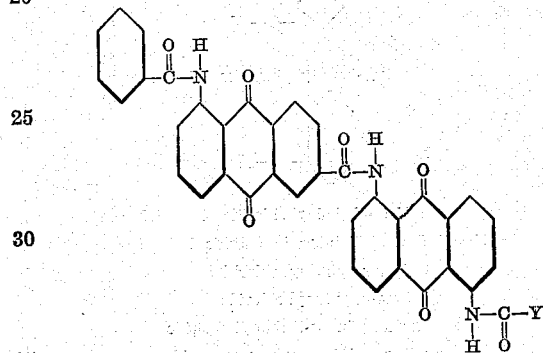

in which Y is a carbocyclic radical, have been found to have exceptionally desirable properties. Compounds falling within the general formula formed from amines whose molecular weight is less than 223 also merit special mention.

In the course of the specification certain equations and formulae have been given for the purpose of aiding in the understanding of the invention. These formulae have not been proven except by the invention herein described, and therefore it is not desired to limit the invention by the same.

As will be clear from the examples the solvent (if any) used may be varied over a wide range depending upon the characteristics of the particular condensation or conversion being carried out. The particular temperatures and time utilized for the various condensations and conversions depend upon the characteristics of the substances being treated. The solvent, temperature, time and other features of the invention which are most desirable for any particular treatment may be determined by one skilled in the art.

Especially desirable results have been obtained with such solvents as nitrobenzene, chlorobenzene, ortho-di-chloro-benzene, toluene, xylene, naphthalene and the like.

Any desired agent may be used in the conversion to the carbonyl halide.

Throughout the specification and claims the term "vat color" is used to cover compounds susceptible to vatting by any of the methods known to the art.

The subject matter of this specification involves an entirely new field of anthraquinone vat dyes. The compounds produced have very desirable properties. While the shade of the dyes produced varies with the particular formula, in general, the colors fall within the range of orange, yellow and brown.

As many apparently widely different embodiments of this invention may be made without departing from the spirit and scope thereof, it is to be understood that I do not limit myself to the specific embodiments thereof except as defined in the appended claims.

I claim:
1. A chemical compound having the formula

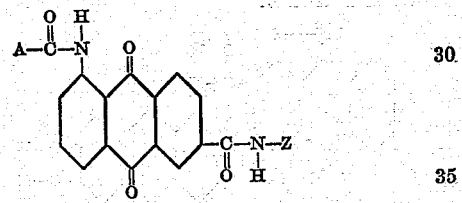

in which A represents a carbon compound radical of the benzene series Z represents a carbon compound radical of the amino-anthraquinone series.

2. The compounds having the general formula

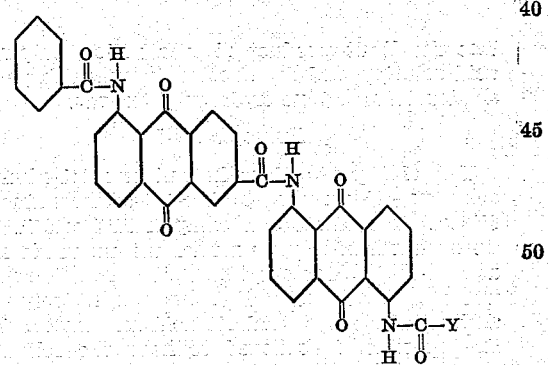

in which Y is a carbocyclic radical.

3. The dye having the probable formula

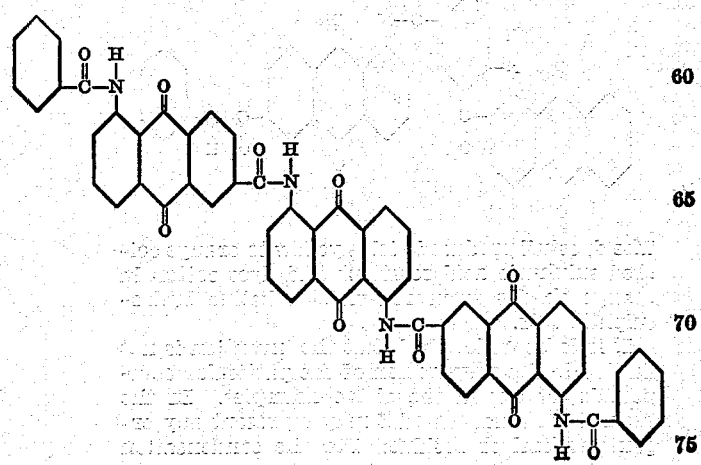

which gives yellow sulphuric acid solutions, Bordeaux to brown alkaline hydrosulphite vats and dyes cotton in yellow shades and which can be produced by reacting 10 parts of benzoyl-amino-1-anthraquinone-6-carbonyl-chloride with 3.0 parts 1,5-di-amino-anthraquinone in nitrobenzene at about 150° C.

4. The process which comprises condensing 1-benzoyl-amino-anthraquinone-6-carbonyl chloride with mono-benzoyl-1,5-di-amino-anthraquinone at room temperatures while suspended in nitrobenzene.

5. The process which comprises condensing 1-amino-anthraquinone-6-carboxylic acid with a carbonyl halide of the benzene series, converting the resultant to the corresponding anthraquinone-6-carbonyl halide and condensing said last mentioned compound with a mono-acyl-diamino anthraquinone, the acyl radical of said diamino anthraquinone being of the benzene series.

6. The process which comprises condensing 1-amino-anthraquinone-6-carboxylic acid with benzoyl chloride, converting the resultant to the corresponding 1-benzoyl-amino-anthraquinone-6-carbonyl halide and condensing the same with a mono-benzoyl-diamino-anthraquinone.

7. The process which comprises condensing 1-amino-anthraquinone-6-carboxylic acid with a carbonyl halide of the benzene series, converting the resultant to the corresponding anthraquinone-6-carbonyl halide and condensing said last mentioned compound with a mono-acyl-diamino anthraquinone.

EARL EDSON BEARD.

Certificate of Correction

Patent No. 2,049,189. July 28, 1936.

EARL EDSON BEARD

It is hereby certified that errors appear in the printed specification of the above numbered patent requiring correction as follows: Page 1, first column, line 9, in the formula, for "A—O—N" read *A—C—N*; and second column, line 30, for "—C—N—Z" read —6—C—N—Z; page 3, second column, lines 46 to 54 inclusive, strike out the formula and insert instead

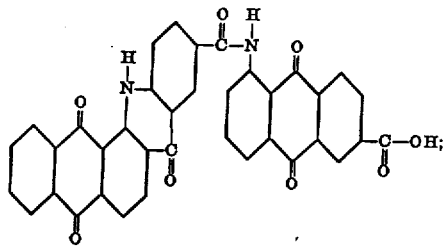

page 9, second column, line 30, for "Iso-phtahahlic" read *Iso-phthalic*; and that the said Letters Patent should be read with these corrections therein that the same may conform to the record of the case in the Patent Office.

Signed and sealed this 24th day of November, A. D. 1936.

[SEAL]

HENRY VAN ARSDALE,
*Acting Commissioner of Patents.*